(12) United States Patent
Venkataraghavan et al.

(10) Patent No.: US 12,069,532 B2
(45) Date of Patent: Aug. 20, 2024

(54) ROAMING COVERAGE EVALUATION

(71) Applicant: Rakuten Mobile, Inc., Tokyo (JP)

(72) Inventors: Krishnan Venkataraghavan, Tokyo (JP); Hiroshi Takeshita, Tokyo (JP); Sharad Sriwastawa, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 372 days.

(21) Appl. No.: 17/495,759

(22) Filed: Oct. 6, 2021

(65) Prior Publication Data

US 2023/0106631 A1 Apr. 6, 2023

(51) Int. Cl.
| | |
|---|---|
| *H04W 36/32* | (2009.01) |
| *H04W 36/00* | (2009.01) |
| *H04W 36/18* | (2009.01) |
| *H04W 84/04* | (2009.01) |

(52) U.S. Cl.
CPC ....... *H04W 36/32* (2013.01); *H04W 36/0061* (2013.01); *H04W 36/0094* (2013.01); *H04W 36/18* (2013.01); *H04W 84/042* (2013.01)

(58) Field of Classification Search
CPC ............. H04W 36/32; H04W 36/0061; H04W 36/0094; H04W 36/18; H04W 84/042; H04W 24/04; H04W 36/0083
See application file for complete search history.

(56) References Cited

U.S. PATENT DOCUMENTS

| | | | |
|---|---|---|---|
| 2006/0270411 A1 | 11/2006 | Grayson | |
| 2011/0051686 A1* | 3/2011 | Lee | H04W 36/0072 370/331 |
| 2012/0164979 A1 | 6/2012 | Bachmann et al. | |
| 2020/0084741 A1 | 3/2020 | Chun et al. | |
| 2020/0314950 A1 | 10/2020 | Dao et al. | |

FOREIGN PATENT DOCUMENTS

| | | | | |
|---|---|---|---|---|
| EP | 1986454 A1 | * | 10/2008 | ............ H04W 92/20 |
| WO | WO-2012116741 A1 | * | 9/2012 | ............ H04W 24/02 |
| WO | WO-2016022239 A1 | * | 2/2016 | ............ H04W 48/20 |

* cited by examiner

*Primary Examiner* — Marisol Figueroa
(74) *Attorney, Agent, or Firm* — HAUPTMAN HAM, LLP

(57) ABSTRACT

Roaming coverage evaluation is performed by receiving a roaming handover message including an error code, the roaming handover message identifies a serving cell and a touch point, verifying whether the touch point is accepting roaming handovers by retrieving roaming information from the touch point, retrieving a signal report from a terminal served by the serving cell in response to determining that the touch point is not accepting roaming handovers, determining a signal strength difference between a signal of the touch point and a signal of a cell neighboring the touch point, and mitigating coverage loss due to the touch point not accepting roaming handovers based on the signal strength difference.

20 Claims, 7 Drawing Sheets

ROAMING COVERAGE EVALUATION

BACKGROUND

A cellular network operator's coverage expands with ongoing network rollouts to attempt to provide seamless coverage, which is not usually feasible on day 1 of network launch. User perception of network quality is negatively impacted by patchy coverage. To reduce this negative perception as the network is expanded, new operators enter into roaming agreements with existing cellular network operators.

User perception of the quality of a cellular network service is also impacted by the quality of any roaming network partners. Providing cellular network service includes ensuring that touchpoints in roaming networks consistently accept handovers. Verifying that user perception impairments are related to roaming network quality is sometimes process intensive and mostly reactive. Further root causing and mitigating issues identified as originating from a roaming network is sometimes more efficient with inter-operator coordination and cooperation by the roaming partner.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
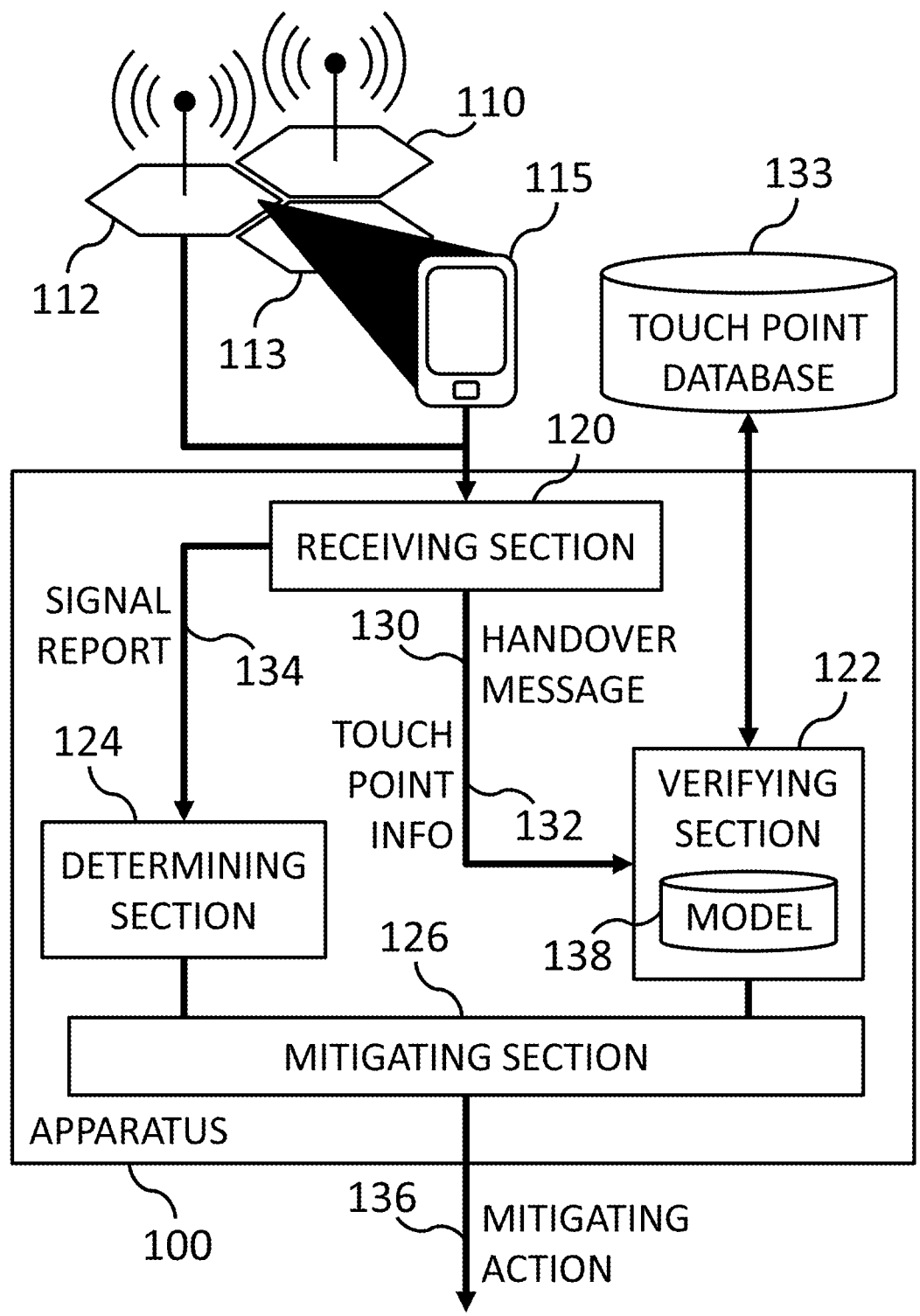
FIG. 1 is a schematic diagram of a system for roaming coverage evaluation, according to at least one embodiment of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Growing network complexity and an expanding subscriber base introduce new challenges in roaming coverage maintenance. For example, maintaining and tracking additional touch points in roaming partner networks is a daily task, in some instances. Monitoring roaming network architecture touch points is helpful in quickly identifying issues. Quickly mitigating such issues is helpful to creating a user perception of seamless network coverage.

In at least some embodiments, an apparatus is configured to monitor and identify various problems arising from roaming touch points, and also to help mitigate coverage loss due to such problems.

In at least some embodiments, a machine learning model estimates whether or not a roaming touch point is currently accepting roaming handovers based on information of the roaming touch point, such as S1AP roaming handover messages as well as information that is able to be read over system block messages. In at least some embodiments, a touch point database stores information of roaming touch points, and is updated and in response to handover errors. In at least some embodiments, an apparatus is configured to generate training data for the model based on a ground truth determination, and training the model with the training data to enhance the accuracy of the machine learning model output estimations.

FIG. 1 is a schematic diagram of a system for roaming coverage evaluation, according to at least one embodiment of the present invention. The diagram includes an apparatus 100, a roaming touch point 110, a serving cell 112, a neighboring cell 113, a terminal 115, and a touch point database 133.

Roaming touch point 110 is a cell of a roaming network that borders one or more cells of a home network, such as serving cell 112, and neighboring cell 113. In at least some embodiments, roaming touch point 110 is a radio communication access point through which one or more terminals, such as terminal 115, communicate with the radio access network. In at least some embodiments, roaming touch point 110 includes a terrestrial cell, a satellite cell, a femto-cell, etc. In at least some embodiments, roaming touch point 110 operates under 4G standards, such as an eNB cell, 5G standards, such as a gNB cell, etc.

Serving cell 112 and neighboring cell 113 are cells of the home network. In at least some embodiments, serving cell 112 and neighboring cell 113 are radio communication access points through which one or more terminals, such as terminal 115, communicate with the radio access network. In at least some embodiments, serving cell 112 and neighboring cell 113 include terrestrial cells, satellite cells, femto-cells, etc., or any combination thereof. In at least some embodiments, serving cell 112 and neighboring cell 113 operate under 4G standards, such as eNB cells, 5G standards, such as gNB cells, etc., or any combination thereof.

In at least some embodiments, the nodes involved in domestic roaming are a source cell, such as serving cell 112, a home Mobility Management Entity (MME), a target cell, such as roaming touch point 110, and a roaming MME. In at least some embodiments, the home MME and the roaming MME are in communication through an S10 interface. In at least some embodiments, a roaming network identifier is broadcasted in the System Information Block 1 (SIB1) of cells in the roaming network and the home network is configured to define into the operator controlled network identifiers of Subscriber Identity Module (SIM) cards of terminals as well as equivalent network identifier definitions in the home MME, in accordance with ETSI Technical Specification 136 413.

In at least some embodiments, a handover of terminal 115 from serving cell 112 of the home network to roaming touch point 110 of the roaming network is performed as follows. Terminal 115 measures the E-UTRA Absolute Radio Frequency Channel Number (EARFCN) of the roaming network with a predefined mobility strategy, and transmits a measurement report once criteria of the mobile strategy is met. Serving cell 112 causes terminal 115 to read the cell identifier of roaming touch point 110 from SIB1, which corresponds to the reported Physical Cell Identifier (PCI) by terminal 115, with a handover command. Terminal 115 reads and reports the CGI of roaming touch point 110 from the SIB1 to serving cell 112, from which the handover command was received. Serving cell 112 resolves the CGI to determine availability of the roaming network in the SIB1 and a handover restriction list, in accordance with ETSI Technical Specification 136 413. In at least some embodiments, the handover restriction list provides information on roaming or access restriction information to serving cell 112 to make decisions regarding handover procedures. Then, serving cell 112 notifies the home MME that a handover is required with details of a source-to-target transparent container. The home MME then looks up the target Tracking Area Identity (TAI) to select the roaming MME as the target to which the relocation request is to be transmitted. A forward relocation request is transmitted to the (target) roaming MME, and subsequently the Target TAI sent in the source-to-target transparent container is also used by the (target) roaming MME to select the Serving Gateway (SGW) of the roaming network. The (target) roaming MME transmits the handover request to the roaming touch point 110, including the details of bearers to be established as well as the S1AP cause as received from serving cell 112 along with the information in the source-to-target transparent container. Roaming touch point 110 transmits a handover request acknowledgement including details of any resources reserved in a target-to-source container encompassing the handover command. The (target) roaming MME transmits a forward relocation response on the s10 interface towards the (source) home MME including details of Cause IE which contains one of the following values: "Request-accepted", "System failure", "Mandatory IE incorrect", "Mandatory IE missing", "Conditional IE missing", "No resources available", "Invalid message format", "Relocation failure", etc. The (source) home MME transmits the handover command to serving cell 112 including the S1AP cause value indicating a successful or a failure cause. In at least some embodiments, each of the failure causes is further bifurcated to indicate the probable failure cause per group, in accordance with 3GPP 36.413. Depending on the S1AP cause, serving cell 112 reconfigures terminal 115 with the handover command to enable terminal 115 to move to roaming touch point 110, or marks the ongoing handover as a failure.

Apparatus 100 includes receiving section 120, verifying section 122, determining section 124, and mitigating section 126. In at least some embodiments, apparatus 100 is configured to perform roaming coverage evaluation. In at least some embodiments, receiving section 120 is configured to receive roaming handover messages, such as roaming handover message 130, and touch point information, such as touch point information 132, from roaming touch points, such as roaming touch point 110, directly, through the roaming network of roaming touch point 110, or through terminals in communication with roaming touch point 110, such as terminal 115. In at least some embodiments, receiving section 120 is further configured to receive signal reports from terminals, such as terminal 115.

In at least some embodiments, verifying section 122 is configured to verify whether a roaming touch point, such as roaming touch point 110, is currently accepting roaming handovers based on roaming handover messages and touch point information. In at least some embodiments, verifying section 122 stores and retrieves touch point information from touch point database 133. In at least some embodiments, touch point database 133 is a data storage device that is directly connected to apparatus 100 or in communication with apparatus 100 through a network, such as a Local Area Network (LAN), or the Internet. In at least some embodiments, verifying section is configured to periodically retrieving roaming information from the touch point, the roaming information stored in a database. In at least some embodiments, verifying section 122 is configured to apply a machine learning model, such as model 138, to the roaming handover messages and touch point information to verify whether a roaming touch point is currently accepting roaming handovers. In at least some embodiments, verifying section 122 is configured to retrieve touch point information for more than one roaming touch point in response to receiving a roaming handover message including an error. In at least some embodiments, verifying section 122 is configured to retrieve touch point information in response to a roaming cell not being available.

In at least some embodiments, determining section 124 is configured to determine an amount of coverage loss due to a roaming touch point, such as roaming touch point 110, not accepting roaming handovers based on signal reports, such as signal report 134. In at least some embodiments, determining section 124 is configured to instruct terminals, such as terminal 115, to detect signal strength of nearby cells and report the results in a signal report, such as signal report 134, in response to the verifying section determining that a roaming touch point, such as roaming touch point 110, is not currently accepting roaming handovers. In at least some embodiments, determining section 124 is configured to compare the signal strength of a roaming touch point verified as not currently accepting roaming handovers with the signal strength of other cells. In at least some embodiments, determining section 124 makes separate comparisons of individual geographic regions or of individual terminals.

In at least some embodiments, mitigating section 126 is configured to mitigate coverage loss due to a roaming touch point, such as roaming touch point 110, not accepting roaming handovers. In at least some embodiments, mitigating section 126 is configured to take mitigating actions, such as mitigation action 136, such as adjusting an area of coverage of a cell neighboring the touch point or deploying one or more cells to at least a portion of a geographic area served by the touch point. In at least some embodiments, mitigating section 126 is configured to adjust an area of coverage of the cell neighboring the touch point in response to the signal strength difference not being lower than a threshold value. In at least some embodiments, mitigating section 126 is configured to cause adjustment of an area of coverage by instructing a cell to adjust at least one of the tilt, Pa, or Pb, or instructing a satellite cell to reposition. In at least some embodiments, mitigating section 126 is configured to deploy one or more cells to at least a portion of a geographic area served by the touch point in response to the signal strength difference being lower than a threshold value. In at least some embodiments, mitigating section 126 is configured to cause deployment of one or more cells by deploying a mobile cell, such as a wheeled or airborne vehicle that is either autonomous or human-piloted, or by delivering a home femtocell to a home address of one or more subscribers, such as subscribers negatively impacted by the coverage loss.

Figure 2:
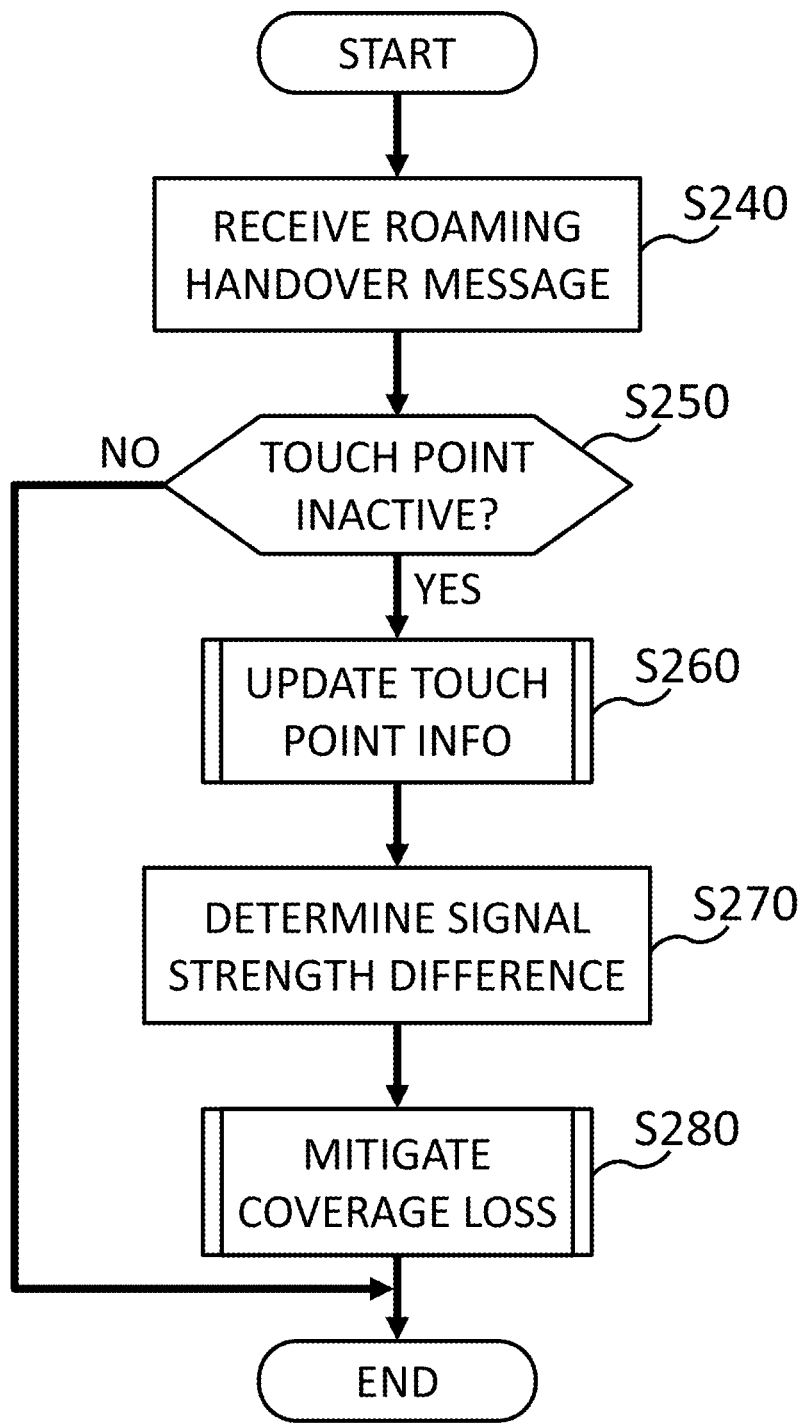
FIG. 2 is an operational flow for roaming coverage evaluation, according to at least one embodiment of the present invention.

FIG. 2 is an operational flow for roaming coverage evaluation, according to at least one embodiment of the present invention. The operational flow provides a method of roaming coverage evaluation. In at least some embodiments, the method is performed by a controller of an apparatus including sections for performing certain operations, such as the controller and apparatus shown in FIG. 7, which will be explained hereinafter.

At S240, a receiving section or a sub-section thereof receives a roaming handover message, the roaming handover message including an error. In at least some embodiments, the receiving section receives the roaming handover message from a serving cell of a home network. In at least some embodiments, the receiving section receives a roaming handover message including an error code, the roaming handover message identifying a serving cell and a touch point. In at least some embodiments, the receiving section receives only roaming handover messages including errors from one or more serving cells. In at least some embodiments, the receiving section receives a roaming handover message issued by an MME of a roaming network. In at least some embodiments, the receiving section receives other information that triggers the operational flow. In at least some embodiments, roaming termination detection triggers the operational flow of FIG. 2, such as post roaming cutoff detection on any one cell of the roaming network. In at least some embodiments, an X2 status is updated by serving cell of the home network in response to detecting the roaming cutoff, such as by propagating on X2 a flag.

Figure 3:
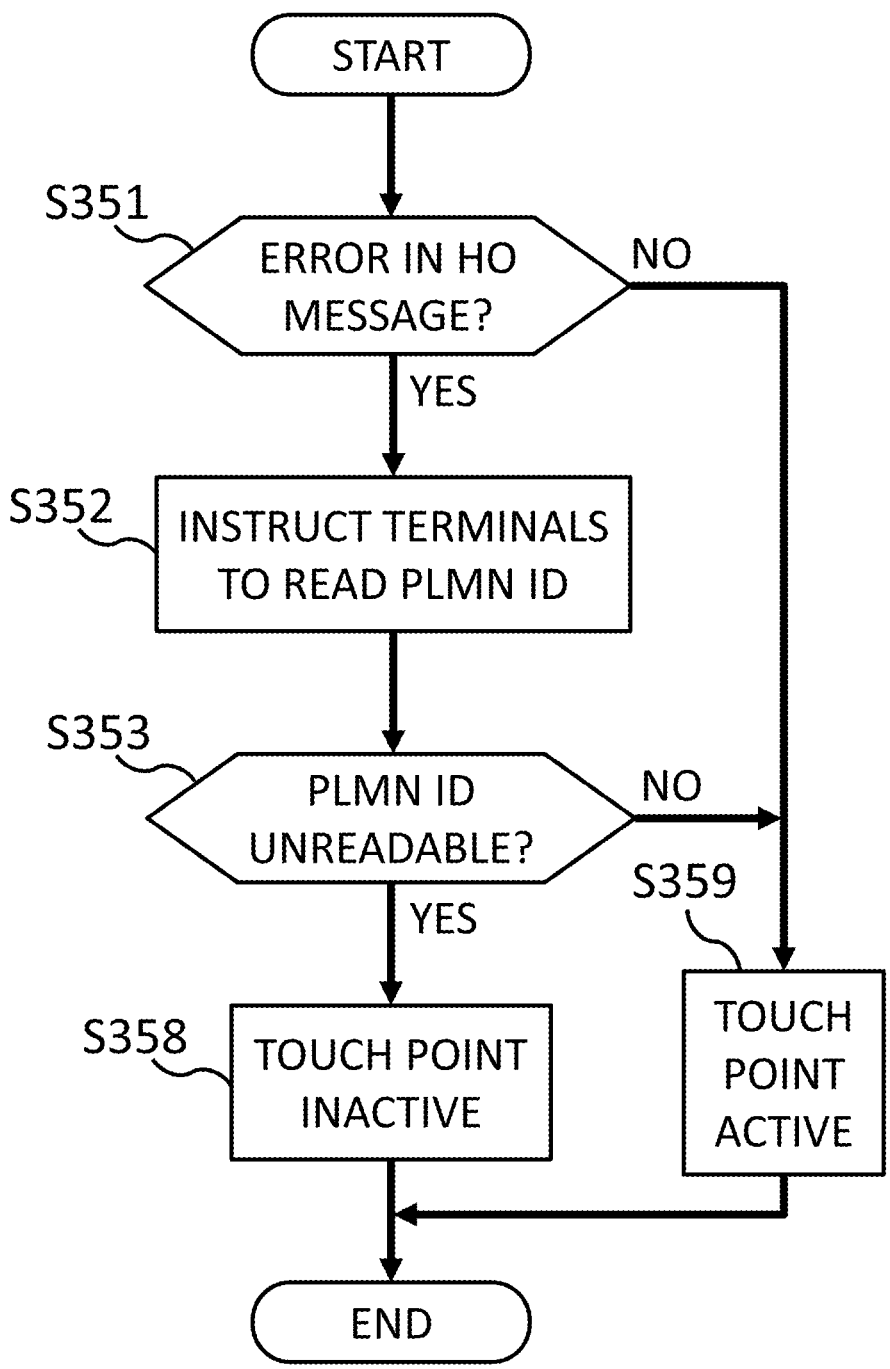
FIG. 3 is a first operational flow for verifying roaming touch point inactivity, according to at least one embodiment of the present invention.
Figure 4:
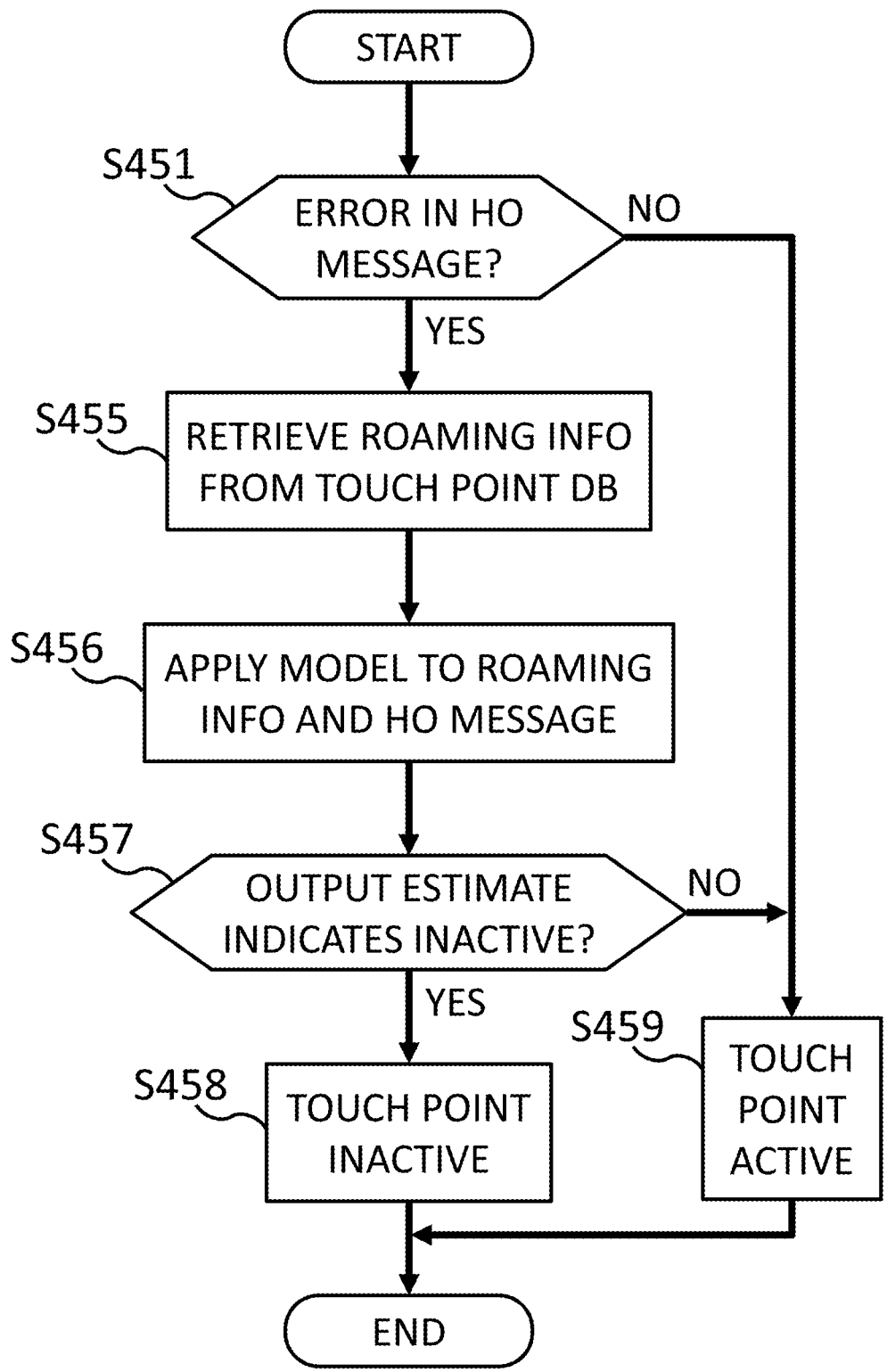
FIG. 4 is a second operational flow for verifying roaming touch point inactivity, according to at least one embodiment of the present invention.

At S250, a verifying section or a sub-section thereof verifies whether a touch point is inactive. In at least some embodiments, the verifying section verifies whether the touch point is accepting roaming handovers by retrieving roaming information from the touch point. In at least some embodiments, the verifying section verifies whether the touch point identified in the roaming handover message is currently not accepting handovers from the home network. In at least some embodiments, the verifying section verifies whether multiple touch points of the same roaming network as the touch point identified in the roaming handover message are inactive in response to receiving the roaming handover message including the error code. If the verifying section verifies that the touch point is inactive, then the operational flow proceeds to touch point information updating at S260. If the verifying section does not verify that the touch point is inactive, then the operational flow ends. In at least some embodiments, the touch point inactivity verification proceeds as shown in FIG. 3 or FIG. 4, each of which will be explained hereinafter.

Figure 5:
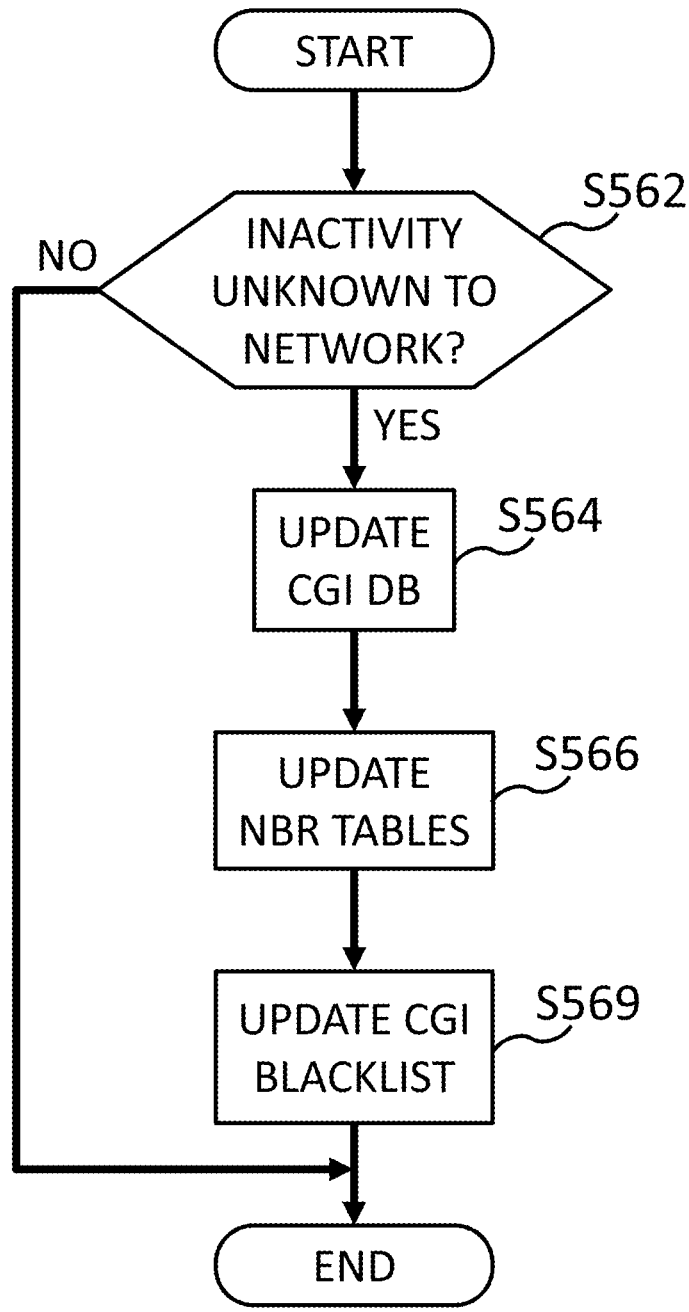
FIG. 5 is an operational flow for updating roaming touch point information, according to at least one embodiment of the present invention.

At S260, the controller or a section thereof updates the touch point information. In at least some embodiments, the verifying section updates the touch point information. In at least some embodiments, the controller updates the touch point information in the touch point database. In at least some embodiments, the controller updates the touch point information of the home network to indicate that the touch point identified in the roaming handover message including an error is not currently accepting handovers. In at least some embodiments, the touch point information updating proceeds as shown in FIG. 5, which will be explained hereinafter.

At S270, a determining section or a sub-section thereof determines a signal strength difference. In at least some embodiments, the determining section determines a signal strength difference between signal of the touch point and signal of a cell neighboring the touch point. In at least some embodiments, the determining section compares the signal strength of the touch point with the strongest signal strength among neighboring cells from a signal report of a single terminal. In at least some embodiments, the determining section determines an average signal strength difference between the touch point and the strongest signal strength among neighboring cells from the same signal report. In at least some embodiments, the determining section divides the signal reports into groups of similar location, and determines a signal strength difference for each group.

Figure 6:
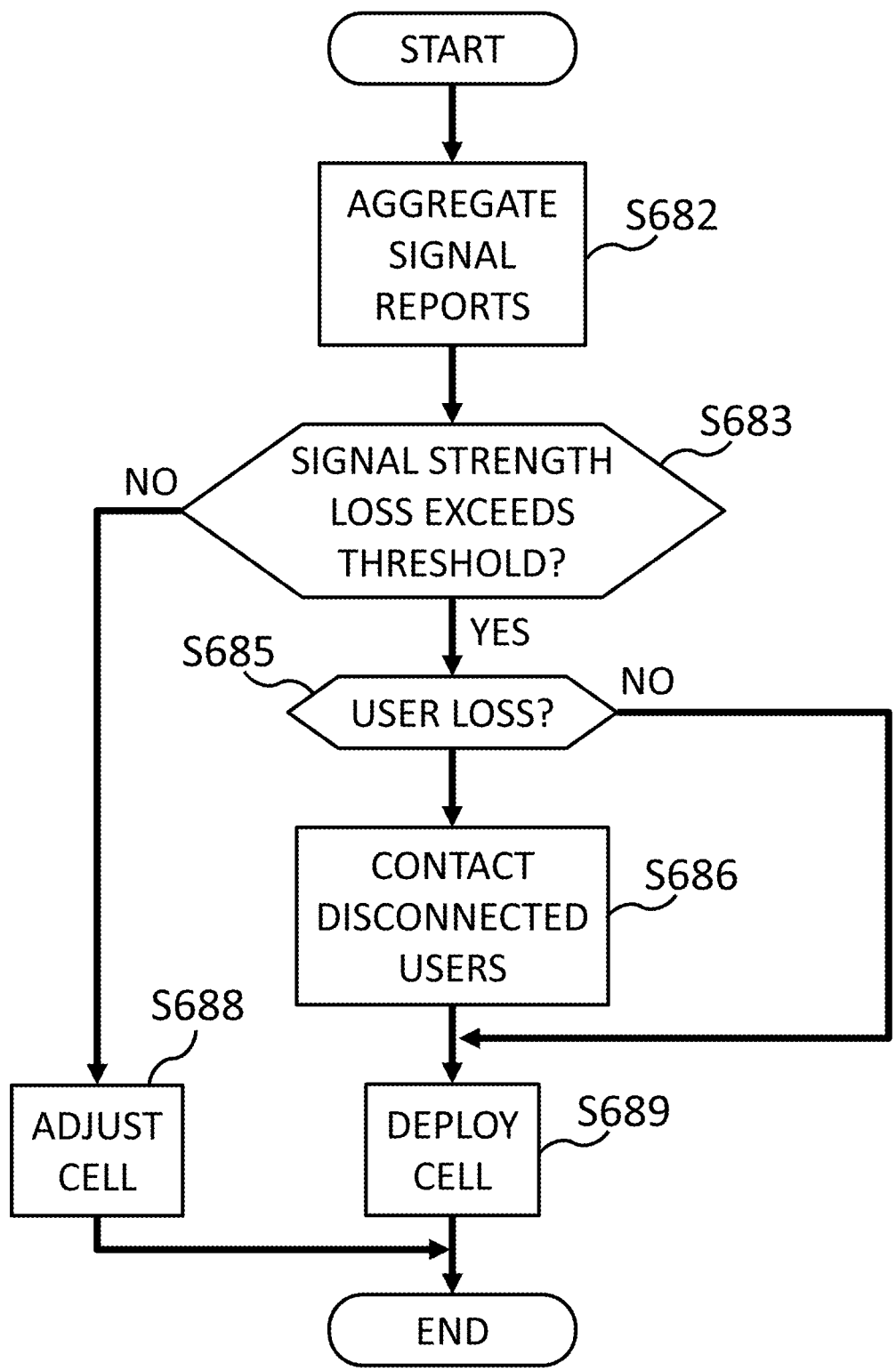
FIG. 6 is an operational flow for mitigating coverage loss, according to at least one embodiment of the present invention.

At S280, a mitigating section or a sub-section thereof mitigates coverage loss. In at least some embodiments, the mitigating section mitigates any coverage loss due to the touch point not accepting roaming handovers based on the signal strength difference. In at least some embodiments, the mitigating section adjusts an area of coverage of the cell neighboring the touch point or deploys one or more cells to at least a portion of a geographic area served by the touch point. In at least some embodiments, the touch point information updating proceeds as shown in FIG. 6, which will be explained hereinafter.

FIG. 3 is a first operational flow for verifying roaming touch point inactivity, according to at least one embodiment of the present invention. The operational flow provides a first method of verifying roaming touch point inactivity. In at least some embodiments, the method is performed by a verifying section of an apparatus, such as the apparatus shown in FIG. 7, which will be explained hereinafter.

At S351, the verifying section or a sub-section thereof determines whether there is an error in the roaming handover message. In at least some embodiments, the verifying section reads the roaming handover message and determines whether there is an indication that the roaming handover was successful, or whether there is an indication that the roaming handover was not successful. If the verifying section determines that there is an error in the roaming handover message, then the operational flow proceeds to terminal instructing at S352. If the verifying section determines that there is no error in the roaming handover message, then the operational flow proceeds to S359, where the verifying section concludes that the touch point is active, and currently accepting roaming handovers.

At S352, the verifying section or a sub-section thereof instructs one or more terminals to read the PLMN identifier of the touch point. In at least some embodiments, the verifying section causes the terminals to read the PLMN identifier through the SIB. In at least some embodiments, the verifying section instruction terminals to read the PLMN identifier of other touch points within the same roaming network as the touch point identified in the roaming handover message.

At S353, the verifying section or a sub-section thereof determines whether the PLMN identifier is unreadable. In at least some embodiments, the verifying section determines whether a terminal is able to read a Roaming PLMN Identifier from the touch point. If the verifying section determines that the PLMN identifier is not unreadable, then the operational flow proceeds to S358, where the verifying section concludes that the touch point is inactive, and currently not accepting roaming handovers. If the verifying section determines that the PLMN identifier is not unreadable, then the operational flow proceeds to S359, where the verifying section concludes that the touch point is active, and currently accepting roaming handovers.

FIG. 4 is a second operational flow for verifying roaming touch point inactivity, according to at least one embodiment of the present invention. The operational flow provides a second method of verifying roaming touch point inactivity. In at least some embodiments, the method is performed by a verifying section of an apparatus, such as the apparatus shown in FIG. 7, which will be explained hereinafter.

At S451, the verifying section or a sub-section thereof determines whether there is an error in the roaming handover message. In at least some embodiments, the verifying section reads the roaming handover message and determines whether there is an indication that the roaming handover was successful, or whether there is an indication that the roaming handover was not successful. If the verifying section determines that there is an error in the roaming handover message, then the operational flow proceeds to roaming information retrieving at S455. If the verifying section determines that there is no error in the roaming handover message, then the operational flow proceeds to S459, where the verifying section concludes that the touch point is active, and currently accepting roaming handovers.

At S455, the verifying section or a sub-section thereof retrieves roaming information from a touch point database. In at least some embodiments, the verifying section retrieves roaming information from the touch point database about the touch point. In at least some embodiments, the verifying section populates the touch point database with roaming information prior to receiving the roaming handover message with an error by periodically retrieving roaming information from the touch point, the roaming information stored in the touch point database. In at least some embodiments, the verifying section retrieves roaming information from the touch point through the terminal to populate the touch point database. In at least some embodiments, the roaming information includes one or more flags for indicating roaming CGI, roaming activation status per CGI of the roaming network, CGI validity, CGI read trigger, coverage degradation, user loss detection, and Error Cause per CGI. In at least some embodiments, the roaming information further includes one or more of on-air status, planned site status, planned on-air date, relation level neighbor database, NBR list including home network and roaming network neighboring cells, PLMN identifiers read in SIB1 per neighboring cell CGI, primary PLMN identifier of roaming operator, equivalent PLMN of roaming operator, traffic per roaming CGI, average RSRP/RSRQ/SINR/etc. per grid, serving CGI identifiers per grid, Unique CGI per grid, Unique IMSI/CGI, etc. In at least some embodiments, the period in which roaming information is retrieved is based on the frequency that roaming networks change.

At S456, the verifying section or a sub-section thereof applies a machine learning model to the roaming information and the roaming handover message. In at least some embodiments, the verifying section. In at least some embodiments, the verifying section concatenates the data of the roaming information and the roaming handover message, and applies the concatenation to the input layer of the machine learning model. In at least some embodiments, the verifying section preprocesses the data of the roaming information and the roaming handover message before applying the machine learning model. In at least some embodiments, the machine learning model is trained to relate roaming handover messages and roaming information to an estimation of whether or not the touch point is currently accepting roaming handovers.

At S457, the verifying section or a sub-section thereof determines whether the estimate output from the machine learning model indicates that the touch point is inactive. In at least some embodiments, the verifying section post-processes the output from the machine learning model to make the determination. If the verifying section determines that the estimate output from the machine learning model indicates that the touch point is inactive, then the operational flow proceeds to S458, where the verifying section concludes that the touch point is inactive, and currently not accepting roaming handovers. If the verifying section determines that the estimate output from the machine learning model indicates that the touch point is active, then the operational flow proceeds to S459, where the verifying section concludes that the touch point is active, and currently accepting roaming handovers.

In at least some embodiments, the verifying section receives confirmation of whether the touch point is active or inactive at a later time, for purposes of training the model. In at least some embodiments, the verifying section determines whether the terminal is able to read a Roaming PLMN Identifier from the touch point, similar to the operation at S353 in FIG. 3. In at lest some embodiments, the verifying section labels the roaming information and the roaming handover message as a training sample based on whether the terminal is able to read the Roaming PLMN Identifier from the touch point. In at least some embodiments, the verifying section trains the model with the training sample once the training sample has been labeled. In at least some embodiments, the verifying section receives confirmation from a technician or other human operator.

FIG. 5 is an operational flow for updating roaming touch point information, according to at least one embodiment of the present invention. The operational flow provides a method of updating roaming touch point information. In at least some embodiments, the method is performed by a controller of an apparatus, such as the controller and apparatus shown in FIG. 7, which will be explained hereinafter.

At S562, the controller or a section thereof determines whether the inactivity of the touch point is unknown to the network. In at least some embodiments, the controller determines whether the inactivity of the touch point is reflected in a CGI database, NBR tables of the cells of the home network and within the terminals served by the home network, a CGI blacklist, etc. In at least some embodiments, the controller makes the determination for individual components before updating, rather than making the determinations for all 3 aspects at once. If the controller determines that the inactivity of the touch point is unknown to the network, then the operational flow proceeds to CGI database updating at S564. If the controller determines that the inactivity of the touch point is not unknown to the network, then the operational flow ends.

At S564, the controller or a section thereof updates the CGI database. In at least some embodiments, the controller updates the CGI database in the home network by setting the CGI of the touch point to indicate that roaming handovers are not currently being accepted. In at least some embodiments, the controller updates the CGI database in the home network by setting the CGI of other cells in the same roaming network as the touch point to indicate that roaming handovers are not currently being accepted.

At S566, the controller or a section thereof updates the NBR tables of one or more cells of the home network. In at least some embodiments, the controller updates the NBR tables of neighboring cells of the touch point to indicate that the touch point is not currently accepting roaming handovers. In at least some embodiments, the controller updates the NBR tables of cells in the home network to indicate that other cells in the same roaming network as the touch point are not currently accepting roaming handovers.

At S569, the controller or a section thereof updates a CGI blacklist. In at least some embodiments, the controller updates the CGI blacklist to indicate that the touch point is not currently accepting roaming handovers.

FIG. 6 is an operational flow for mitigating coverage loss, according to at least one embodiment of the present invention. The operational flow provides a method of mitigating coverage loss. In at least some embodiments, the method is performed by a determining section and a mitigating section of an apparatus, such as the apparatus shown in FIG. 7, which will be explained hereinafter.

At S682, the determining section or a sub-section thereof aggregates signal reports. In at least some embodiments, the determining section retrieves a signal report from a terminal served by the serving cell in response to determining that the touch point is not accepting roaming handovers. In at least some embodiments, the determining section instructs each of a plurality of terminals to detect signal strength of nearby cells, and transmit a signal report to the apparatus. In at least some embodiments, the determining section determines an overall average signal strength difference between the touch point and the strongest signal strength among neighboring cells from each signal report. In at least some embodiments, the determining section divides the signal reports into groups of similar location, and determines an average signal strength difference for each group. In at least some embodiments, the determining section obtains the Reference Signals Received Power (RSRP) delta of each sector in a grid.

At S683, the determining section or a sub-section thereof determines whether the signal strength loss exceeds a threshold value. In at least some embodiments, the signal strength loss is the amount by which signal strength is reduced without the touch point. If the determining section or a sub-section thereof determines that the signal strength loss exceeds a threshold value, then the operational flow proceeds to user loss determination at S685. If the determining section or a sub-section thereof determines that the signal strength loss does not exceed a threshold value, then the operational flow proceeds to cell adjustment at S688.

At S685, the determining section or a sub-section thereof determines any user loss. In at least some embodiments, the determining section determines whether any users or subscriber devices were disconnected as a result of the touch point no longer accepting roaming handovers. In at least some instances, a subscriber device does not have enough signal in the geographic area of the touch point to make a connection to a cellular network without being able to connect to the touch point. In at least some instances, a touch point breaks connection with a subscriber device in addition to not accepting roaming handovers. In at least some embodiments, the determining section reviews Call Detail Records (CDR) and Session Detail Records (SDR) for activity from the touch point to determine which subscriber devices, if any, recently dropped activity. In at least some embodiments, the determining section detects the number of unique IMSI connected to the roaming network just before the roaming cutoff and just after the roaming cutoff, and determines whether there are fewer IMSI after the roaming cutoff. In at least some embodiments, the determining section further reviews for indications of intentional disconnections, such as when a subscriber device is turned off, reset, or had the SIM card removed. If the determining section determines that there is user loss, then the operational flow proceeds to disconnected user contact at S686. If the determining section determines that there is no user loss, then the operational flow proceeds to cell deployment at S689.

At S686, the mitigating section or a sub-section thereof contacts disconnected users. In at least some embodiments, the mitigating section contacts any users of subscriber devices that were disconnected as a result of the touch point no longer accepting roaming handovers. In at least some embodiments, the mitigating section reads contact information, such as email addresses or alternative phone numbers, for each user from a database of subscriber information. In at least some embodiments, the mitigating section causes an automated telephone call to be placed to the user, or causes an email to be transmitted to the user. In at least some embodiments, the content of the call or email includes a request to verify disconnection, and an offer for compensation due to the disconnection. In at least some embodiments, the mitigating section broadcasts an alert to all subscribers, or posts an alert on a website or other medium.

At S688, the mitigating section or a sub-section thereof adjusts a cell. In at least some embodiments, the mitigating section adjusts an area of coverage of the cell neighboring the touch point in response to the signal strength difference not being lower than a threshold value. In at least some embodiments, the mitigating section adjusts performance values of a terrestrial cell, such as tilt, Pa, and Pb, or instructs a satellite cell to reposition in order to adjust the area of coverage to compensate for signal strength loss.

At S689, the mitigating section or a sub-section thereof deploys a cell. In at least some embodiments, the mitigating section deploys one or more cells to at least a portion of a geographic area served by the touch point in response to the signal strength difference being lower than a threshold value. In at least some embodiments, mitigating section causes deployment of one or more cells by deploying a mobile cell, such as a wheeled or airborne vehicle that is either autonomous or human-piloted, or by delivering a home femtocell to a home address of one or more subscribers, such as subscribers negatively impacted by the coverage loss.

In at least some embodiments where the determining section determines a signal strength loss for each of multiple divisions of a geographic area, such as RSRP delta values of each sector in a grid, operations S683 to S689 are performed for each division or sector in the grid. In at least some embodiments, for each cycle of operational flow for roaming coverage evaluation, such as the operational flow in FIG. 2, the verifying section generates training data for the machine learning model using input from the touch point database, the roaming handover message error, such as an S1AP cause code on the S10/S1AP interface per ECGI, the outcome of the mitigation operational flow, such as IMSI of each lost user, alternative coverage solution, such as cell adjustment or deployment, etc., and outcomes of the verification operational flow, such as the operational flow in FIGS. 3 and 4, including roaming termination detection, ECGI change detection, such as when a touch point becomes controlled by a different network operator, DNS unreachable, detection, etc. In at least some embodiments, each of the foregoing verifications is associated with respective mitigation actions to reinforce and increase the trigger detection accuracy.

Figure 7:
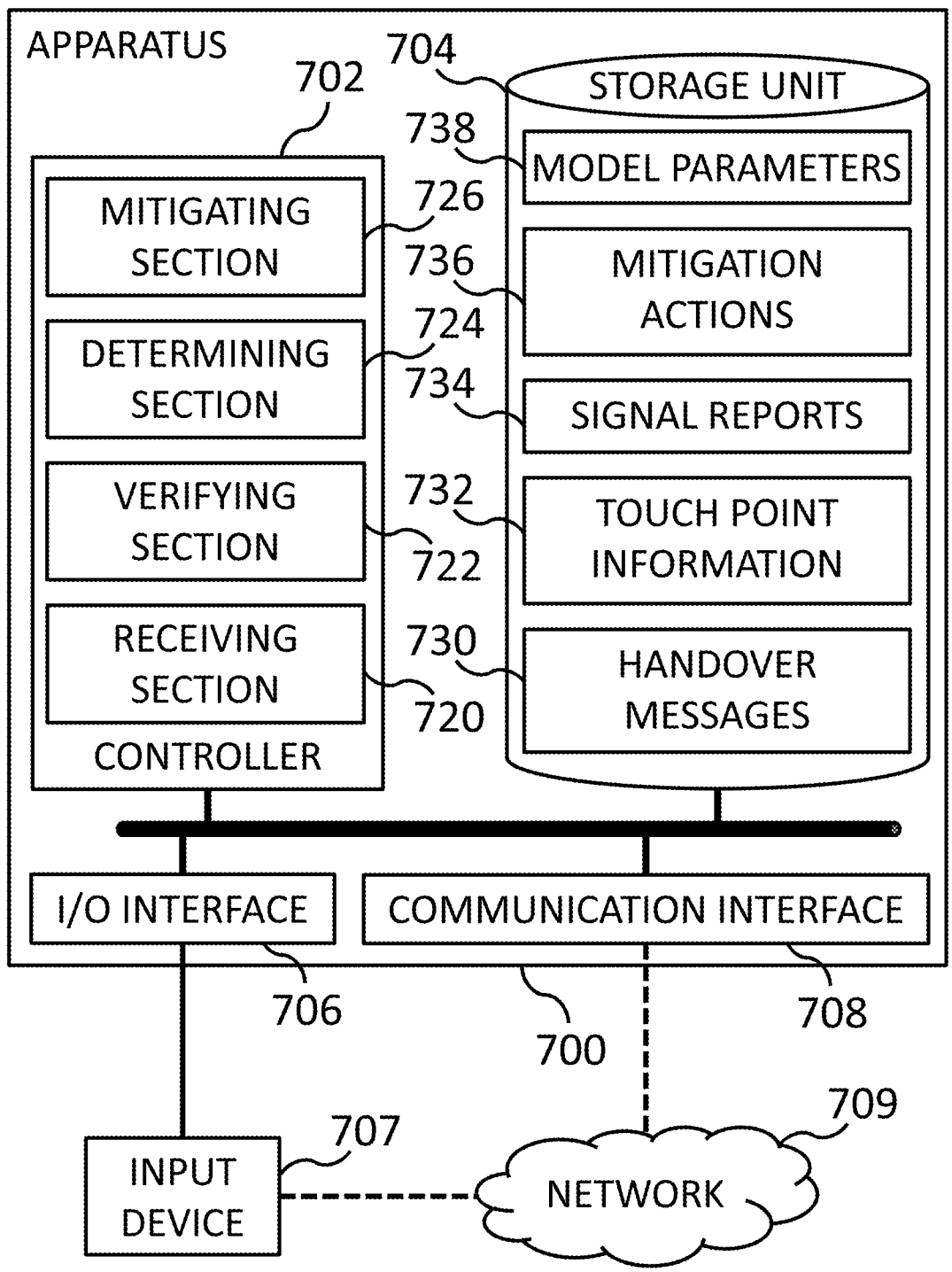
FIG. 7 is a block diagram of an exemplary hardware configuration for roaming coverage evaluation, according to at least one embodiment of the present invention.

FIG. 7 is a block diagram of an exemplary hardware configuration for roaming coverage evaluation, according to at least one embodiment of the present invention.

The exemplary hardware configuration includes apparatus 700, which communicates with network 709, and interacts with input device 707. In at least some embodiments, apparatus 700 is a computer or other computing device that receives input or commands from input device 707. In at least some embodiments, apparatus 700 is a host server that connects directly to input device 707, or indirectly through network 709. In at least some embodiments, apparatus 700 is a computer system that includes two or more computers. In at least some embodiments, apparatus 700 is a personal computer that executes an application for a user of apparatus 700.

Apparatus 700 includes a controller 702, a storage unit 704, a communication interface 708, and an input/output interface 706. In at least some embodiments, controller 702 includes a processor or programmable circuitry executing instructions to cause the processor or programmable circuitry to perform operations according to the instructions. In at least some embodiments, controller 702 includes analog or digital programmable circuitry, or any combination thereof. In at least some embodiments, controller 702 includes physically separated storage or circuitry that interacts through communication. In at least some embodiments, storage unit 704 includes a non-volatile computer-readable medium capable of storing executable and non-executable data for access by controller 702 during execution of the instructions. Communication interface 708 transmits and receives data from network 709. Input/output interface 706 connects to various input and output units, such as input device 707, via a parallel port, a serial port, a keyboard port, a mouse port, a monitor port, and the like to accept commands and present information.

Controller 702 includes receiving section 720, verifying section 722, determining section 724, and mitigating section 726. Storage unit 704 includes roaming handover messages 730, touch point information 732, signal reports 734, mitigating actions 726, and machine learning model 738.

Receiving section 720 is the circuitry or instructions of controller 702 configured to receive handover messages, signal reports, touch point information, or any other transmissions from outside apparatus 700. In at least some embodiments, receiving section 720 records information to storage unit 704, such as in roaming handover messages 730, touch point information 732, and signal reports 734. In at least some embodiments, receiving section 720 includes sub-sections for performing additional functions, as described in the foregoing flow charts. In at least some embodiments, such sub-sections are referred to by a name associated with the corresponding function.

Verifying section 722 is the circuitry or instructions of controller 702 configured to create service specifications. In at least some embodiments, verifying section 722 is configured to verify whether a touch point is currently accepting roaming handovers based on roaming handover messages and touch point information. In at least some embodiments, verifying section 722 is configured to periodically retrieve roaming information from the touch point. In at least some embodiments, verifying section 722 records information to storage unit 704, such as in touch point information 732, and model parameters 738, and utilizes information in storage unit 704, such as roaming handover messages 730, touch point information 732, and model parameters 738. In at least some embodiments, verifying section 722 includes sub-sections for performing additional functions, as described in the foregoing flow charts. In at least some embodiments, such sub-sections are referred to by a name associated with the corresponding function.

Determining section 724 is the circuitry or instructions of controller 702 configured to determine whether the signal strength loss exceeds a threshold value, or to determine whether there is any user loss. In at least some embodiments, determining section 724 retrieves information from storage unit 704, such as in signal reports 734. In at least some embodiments, determining section 724 includes sub-sections for performing additional functions, as described in the foregoing flow charts. In at least some embodiments, such sub-sections are referred to by a name associated with the corresponding function.

Mitigating section 726 is the circuitry or instructions of controller 702 configured to mitigate coverage loss due to a touch point not accepting roaming handovers. In at least some embodiments, mitigating section 726 is configured to take mitigating actions such as adjusting an area of coverage of the cell neighboring the touch point or deploying one or more cells to at least a portion of a geographic area served by the touch point. In at least some embodiments, mitigating section 726 utilizes information in storage unit 704, such as signal reports 734, and mitigating actions 736. In at least some embodiments, mitigating section 726 includes sub-sections for performing additional functions, as described in the foregoing flow charts. In at least some embodiments, such sub-sections are referred to by a name associated with the corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

Various embodiments of the present invention are described with reference to flowcharts and block diagrams whose blocks represent (1) steps of processes in which operations are performed or (2) sections of a controller responsible for performing operations. Certain steps and sections are implemented by dedicated circuitry, programmable circuitry supplied with computer-readable instructions stored on computer-readable media, and/or processors supplied with computer-readable instructions stored on computer-readable media. In some embodiments, dedicated circuitry includes digital and/or analog hardware circuits and include integrated circuits (IC) and/or discrete circuits. In some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Various embodiments of the present invention include a system, a method, and/or a computer program product. In some embodiments, the computer program product includes a computer readable storage medium (or media) having computer readable program instructions thereon for causing a processor to carry out aspects of the present invention.

In some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, computer readable program instructions described herein are downloadable to respective computing/processing devices from a computer readable storage medium or to an external computer or external storage device via a network, for example, the Internet, a local area network, a wide area network and/or a wireless network. In some embodiments, the network includes copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, the computer readable program instructions are executed entirely on the user's computer, partly on the user's computer, as a stand-alone software package, partly on the user's computer and partly on a remote computer or entirely on the remote computer or server. In some embodiments, in the latter scenario, the remote computer is connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. Persons skilled in the art would understand that various alterations and improvements to the above-described embodiments are possible. Persons skill in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

According to at least one embodiment of the present invention, roaming coverage evaluation is performed by receiving a roaming handover message including an error code, the roaming handover message identifies a serving cell and a touch point, verifying whether the touch point is accepting roaming handovers by retrieving roaming information from the touch point, retrieving a signal report from a terminal served by the serving cell in response to determining that the touch point is not accepting roaming handovers, determining a signal strength difference between a signal of the touch point and a signal of a cell neighboring the touch point, and mitigating coverage loss due to the touch point not accepting roaming handovers based on the signal strength difference.

Some embodiments include the instructions in a computer program, the method performed by the processor executing the instructions of the computer program, and an apparatus that performs the method. In some embodiments, the apparatus includes a controller including circuitry configured to perform the operations in the instructions.

The foregoing outlines features of several embodiments so that those skilled in the art would better understand the aspects of the present disclosure. Those skilled in the art should appreciate that this disclosure is readily usable as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that various changes, substitutions, and alterations herein are possible without departing from the spirit and scope of the present disclosure.

What is claimed is:

1. A computer readable storage medium including instructions executable by a computer to cause the computer to perform operations comprising:

receiving a roaming handover message including an error code, the roaming handover message identifies a serving cell connected to a home network and a touch point connected to a roaming network;

verifying whether the touch point is accepting roaming handovers by retrieving roaming information from the touch point;

retrieving a signal report from a terminal served by the serving cell in response to determining that the touch point is not accepting roaming handovers;
determining a signal strength difference between a signal of the touch point and a signal of a cell neighboring the touch point; and
mitigating coverage loss due to the touch point not accepting roaming handovers based on the signal strength difference.

2. The computer readable storage medium of claim 1, wherein the mitigating includes at least one of adjusting an area of coverage of the cell neighboring the touch point or deploying one or more cells to at least a portion of a geographic area served by the touch point.

3. The computer readable storage medium of claim 1, wherein the mitigating includes adjusting an area of coverage of the cell neighboring the touch point in response to the signal strength difference being greater than or equal to a threshold value.

4. The computer readable storage medium of claim 1, wherein the mitigating includes deploying one or more cells to at least a portion of a geographic area served by the touch point in response to the signal strength difference being lower than a threshold value.

5. The computer readable storage medium of claim 1, wherein the verifying includes retrieving roaming information from the touch point through the terminal.

6. The computer readable storage medium of claim 5, wherein the verifying further includes determining whether the terminal is able to read a Roaming PLMN Identifier from the touch point.

7. The computer readable storage medium of claim 1, wherein
the operations further comprise periodically retrieving roaming information from the touch point, the roaming information stored in a database; and
the verifying includes retrieving roaming information from the database about the touch point, and applying a machine learning model to the roaming information and the roaming handover message.

8. The computer readable storage medium of claim 7, wherein the verifying further includes:
determining whether the terminal is able to read a Roaming PLMN Identifier from the touch point;
labeling the roaming information and the roaming handover message as a training sample based on whether the terminal is able to read the Roaming PLMN Identifier from the touch point; and
training the machine learning model with the training sample.

9. A method comprising:
receiving a roaming handover message including an error code, the roaming handover message identifies a serving cell connected to a home network and a touch point connected to a roaming network;
verifying whether the touch point is accepting roaming handovers by retrieving roaming information from the touch point;
retrieving a signal report from a terminal served by the serving cell in response to determining that the touch point is not accepting roaming handovers;
determining a signal strength difference between a signal of the touch point and a signal of a cell neighboring the touch point; and
mitigating coverage loss due to the touch point not accepting roaming handovers based on the signal strength difference.

10. The method of claim 9, wherein the mitigating includes at least one of adjusting an area of coverage of the cell neighboring the touch point or deploying one or more cells to at least a portion of a geographic area served by the touch point.

11. The method of claim 9, wherein the mitigating includes adjusting an area of coverage of the cell neighboring the touch point in response to the signal strength difference being greater than or equal to a threshold value.

12. The method of claim 9, wherein the mitigating includes deploying one or more cells to at least a portion of a geographic area served by the touch point in response to the signal strength difference being lower than a threshold value.

13. The method of claim 9, wherein the verifying includes retrieving roaming information from the touch point through the terminal.

14. The method of claim 13, wherein the verifying further includes determining whether the terminal is able to read a Roaming PLMN Identifier from the touch point.

15. The method of claim 9, further comprising:
periodically retrieving roaming information from the touch point, the roaming information stored in a database;
wherein the verifying includes retrieving roaming information from the database about the touch point, and applying a machine learning model to the roaming information and the roaming handover message.

16. The method of claim 15, wherein the verifying further includes:
determining whether the terminal is able to read a Roaming PLMN Identifier from the touch point;
labeling the roaming information and the roaming handover message as a training sample based on whether the terminal is able to read the Roaming PLMN Identifier from the touch point; and
training the machine learning model with the training sample.

17. An apparatus comprising:
a controller including circuitry configured to
receive a roaming handover message including an error code, the roaming handover message identifies a serving cell connected to a home network and a touch point connected to a roaming network;
verify whether the touch point is accepting roaming handovers by retrieving roaming information from the touch point;
retrieve a signal report from a terminal served by the serving cell in response to determining that the touch point is not accepting roaming handovers;
determine a signal strength difference between a signal of the touch point and a signal of a cell neighboring the touch point; and
mitigate coverage loss due to the touch point not accepting roaming handovers based on the signal strength difference.

18. The apparatus of claim 17, wherein the mitigating includes at least one of adjusting an area of coverage of the cell neighboring the touch point or deploying one or more cells to at least a portion of a geographic area served by the touch point.

19. The apparatus of claim 17, wherein the mitigating includes adjusting an area of coverage of the cell neighboring the touch point in response to the signal strength difference being greater than or equal to a threshold value.

20. The apparatus of claim 17, wherein the mitigating includes deploying one or more cells to at least a portion of a geographic area served by the touch point in response to the signal strength difference being lower than a threshold value.

* * * * *